Aug. 15, 1967  D. B. PALL ET AL  3,336,055
FLUID LINE CONNECTIONS

Filed July 10, 1964  3 Sheets-Sheet 1

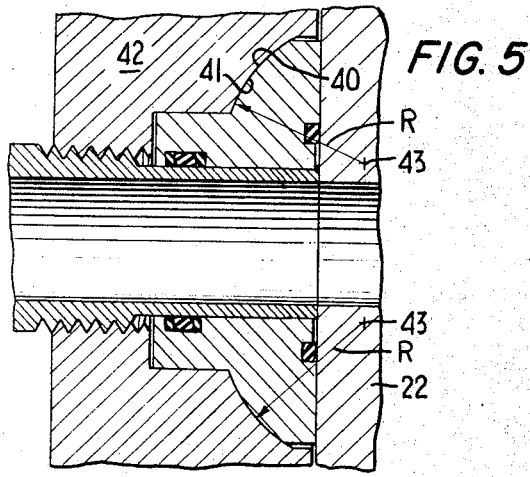
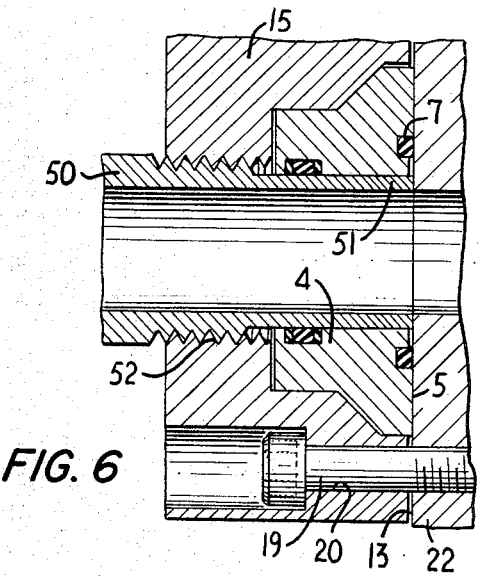
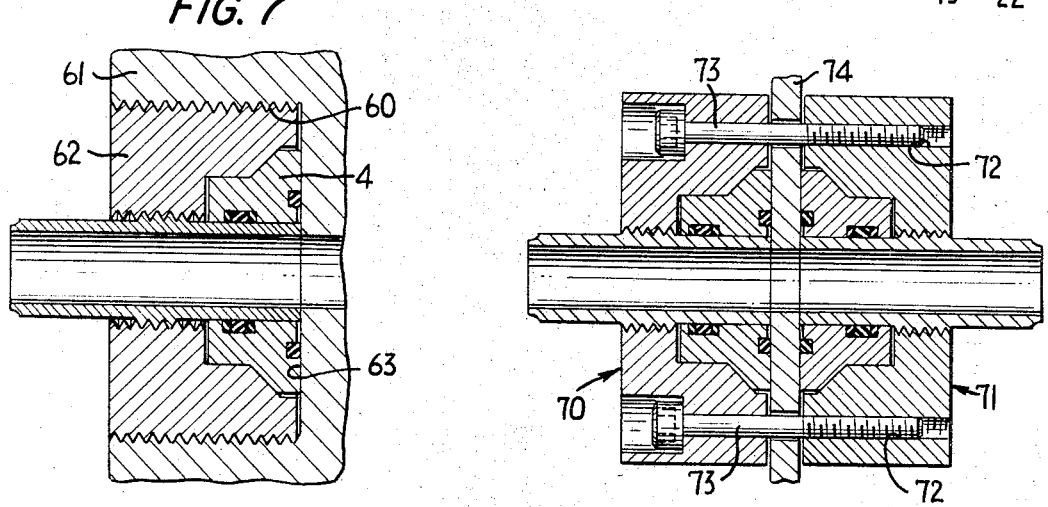
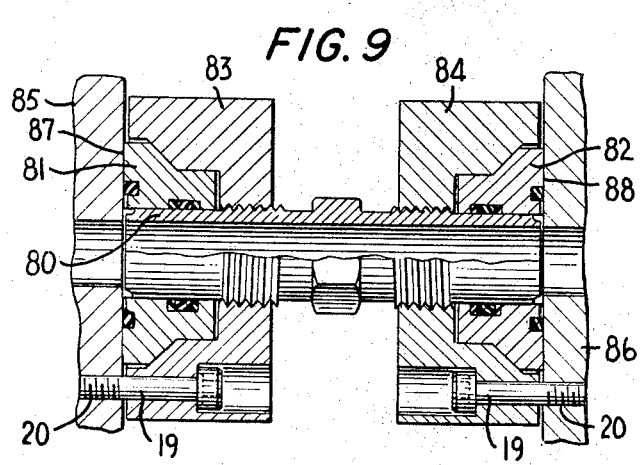
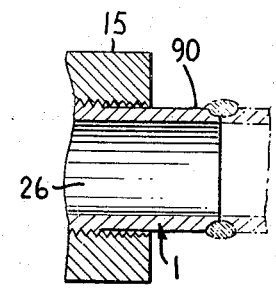

United States Patent Office 3,336,055
Patented Aug. 15, 1967

3,336,055
FLUID LINE CONNECTIONS
David B. Pall, Roslyn Estates, and Leslie Seawert, Glen Cove, N.Y., and Joseph F. Campolong, Danielson, Conn., assignors to Pall Corporation, Glen Cove, N.Y., a corporation of New York
Filed July 10, 1964, Ser. No. 381,764
5 Claims. (Cl. 285—87)

This invention relates to fluid line connectors and more particularly to pipe connectors, adapted for joining sections of fluid lines carrying fluid under very high fluid pressures in excess of 1,000 p.s.i.

The design of fluid couplings used in joining sections of pipe to carry fluid at very high pressures of the order of 1,000 to 18,000 p.s.i. has always presented problems to the art. It is necessary to design the connector in such a manner as to make the connection possible when two sections of line are not in closely abutting relationship and at the same time provide a seal between the sections that is capable of withstanding high pressures. The sections may be so spaced that a considerable gap exists between them. In addition, in some types of installations, such as in submarines, it is desirable that the connector be of small size and weight, because of the space limitations in the installation. Despite the best efforts of the art, however, the pressurized line pipe connectors available have been of very large size, and have included a large number of small parts, each of which must be accurately fitted in order to maintain the seal, and this number of parts is considerably multiplied in the provision of various sizes of fitting required for the various line sizes. Furthermore, the forces resulting from such high pressures cause deformation of the various parts and the design of said parts must be such as to compensate for this deformation or leakage will occur.

Some designs of pipe fitting intended to be used at high pressures have a union which can be backed off during use, with the result that leakage can develop when the unit is subjected, for example, to high vibration. In consequence, a need for the development of a lightweight, simplified fitting has existed.

In accordance with the invention, a fluid connector is provided of simplified and lightweight construction, which is nonetheless capable of ensuring a fluid-tight seal under very high fluid pressures, of the order of 1,000 to 18,000 p.s.i.

The fluid connector of the invention comprises, in combination, a tailpiece adapted for connection to a fluid line, such as pipe; a sealing insert slidably mounted on the tailpiece, and having a first sealing surface adapted to seal against a surface of the component to be attached to the fluid line, and a second sealing surface adapted to seal against a sealing surface on the tailpiece; and a holddown member movably mounted on the tailpiece over the sealing insert for holding the sealing insert against the sealing surface of the said component in a leakproof relationship.

It will usually be found preferable to threadably mount the holddown member on the tailpiece, and to attach the said member to the component to which the fluid connector is to be fitted by bolts adapted to fit corresponding threaded sockets in the said component. However, other attaching means can be used.

The holddown member is designed to thrust the sealing insert firmly against the sealing surface of the component to which the fluid connection is made, and it is therefore important that the abutting surfaces of the sealing insert and holddown member be shaped to receive and to deliver this thrust, respectively, in a manner to effect a secure seal between the sealing insert and the component surface. It has been determined, in accordance with the invention, that optimum thrust is obtained if at least a portion of the two respective abutting thrust surfaces is placed at an angle of approximately 30° to 60° and preferably about 45° to the plane of thrust of the holddown member. The thrust along such an angle makes it possible by component vector forces not only to ensure a tight seal in the plane of thrust but also at right angles thereto, and thus ensure a fluid-tight seal between the sealing insert and component face, and also between the sealing insert and tailpiece. Thus, under high pressures, the expansion of the bolts, which would tend to loosen the face seal, is counteracted by the expansion of the tailpiece and sealing insert against the tapered surface.

The abutting surfaces can be plane or curved, since the particular configuration thereof is not critical, but should be in snug engagement due to closely corresponding shapes for optimum thrust.

This design makes it possible to adjust the holddown member on the tailpiece in a number of different positions, to fit various sizes of gap between the fluid line to be connected to the component, without impairing the sealing due to the sealing insert. It is merely necessary that the total length of holddown member plus the length of tailpiece projecting beyond the holddown member on one end and the small length of sealing insert that may extend beyond the holddown member on the other end be equal to the length of the gap. It will normally be found best to so position the abutting thrust surfaces on the sealing insert and holddown member that the sealing face of the insert projects beyond the holddown member, so that engagement of the latter against the component surface does not prevent attainment of a leakproof seal.

The fluid connector of the invention can be used to connect, for example, two sections of fluid line, such as pipe, or a fluid line to a bulkhead. When used in facing relationship, a pair of the fluid connectors of the invention can serve as bulkhead connectors to connect fluid lines at opposite sides of the bulkhead through the bulkhead. In the usual case, the fluid connector will find its optimum use in connecting a fluid line to a bulkhead or other plane surface.

As a further feature, the invention provides means for preventing accidental breaking of the seal between the tailpiece and sealing insert as well as preventing accidental detachment of the tailpiece from the holddown member during adjustment thereof to fit the gap between the parts to be connected. This means, in one embodiment, comprises a spring-loaded tab fitted on the tailpiece and preventing movement of the member on the tailpiece beyond the tab.

If desired, the tailpiece portion of the fluid connector of the invention can itself be combined or integral with and thus serve as the fluid line or pipe. Stated in another way, one end of the pipe or fluid line is so shaped as to serve as the tailpiece. In this case, the holddown member and sealing insert are mounted over the tailpiece portion of the line, which is shaped correspondingly to receive them, and the mounting portion of the pipe surface can be threaded or otherwise shaped to permit adjustment of position of the holddown member thereon, to correspond to the gap between the end of the pipe or fluid line and the component to which various parts are to be connected.

The invention is illustrated in the drawings, in which:

FIGURE 5 is a cross-sectional view of a further embodiment of fluid connector, in which the thrust bearing portions of the insert and holddown member are shaped to a radial instead of a 45° plane of loading, as in the embodiment of FIGURES 1 to 4.

FIGURE 6 is a cross-sectional view of a further embodiment, in which the tailpiece is itself integral with a line or pipe to be connected by the fluid connector of the invention.

FIGURE 7 is a cross-sectional view of an embodiment of fluid connector, in which the holddown member and lock assembly is threaded into a socket fitted in the end surface of the component to which the connection is to be made.

FIGURE 8 illustrates the use of a pair of connectors in accordance with FIGURES 1 and 7 as a bulkhead connection. It will be noted that a common bolt holds the pair of connectors sealingly against the bulkhead.

FIGURE 9 illustrates a double-ended embodiment of the connector shown in FIGURE 6, to connect two closely spaced components.

FIGURE 10 is a cross-sectional view of a form of fluid connector like that of FIGURES 1 and 2, but with the tailpiece end adapted for butt welding to a pipe connection.

It will be noted that in these drawings like numbers are used for like parts, for simplicity of description.

Figure 1:
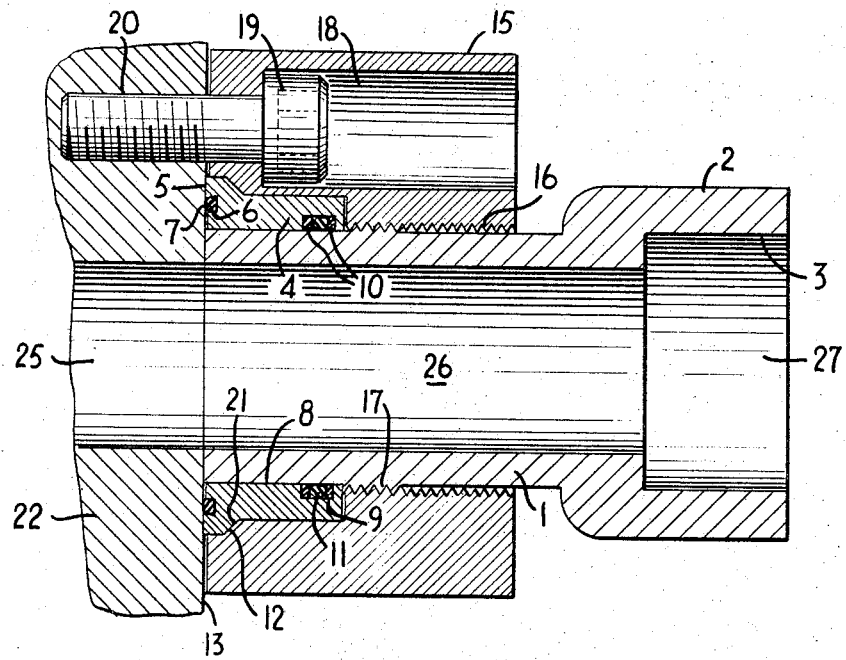
FIGURE 1 represents a cross sectional view of one form of fluid connector in accordance with the invention, having a threaded tailpiece, on which is threadably mounted a typical holddown member and lock assembly.

The fluid connector of FIGURE 1 comprises a tailpiece 1, on one end of which is a socket member 2 for connection thereof to a fluid line or pipe, which is fitted in the socket 3 thereof. Alternatively, the end of the tailpiece may be designed for butt welding. Slidingly mounted over tailpiece 1 is a sealing insert 4, having an outer end sealing surface 5 provided with a circumferential groove 6 in which is disposed an O-ring 7. The inner sliding surface 8 of the insert also is provided with a circumferential groove 9 in which is disposed two anti-extension rings 10, between which is sandwiched an O-ring 11, thus providing a secure seal between the sliding surface of the insert and the outer face of the tailpiece 1.

It will be noted that the outer surface of the sealing insert has a thrust-receiving portion 12, disposed at an angle of 45° to the plane of thrust against the end surface 13 of the component 22, to which the seal is to be effected. Also mounted over the outer surface of the tailpiece 1 is a holddown plate 15. The inner surface of the plate is provided with threads 16 matching corresponding threads 17 on the outer surface of the tailpiece. In this way, the position of the plate on the tailpiece is adjusted simply by rotating the plate in the threads of the tailpiece. At the outer periphery of the holddown plate are a plurality of sockets 18, in this case four, adapted to receive bolts 19 which thread into corresponding sockets 20 in the component 22. The inner face of plate 15 has a thrust-delivering or loading portion 21 adapted to bear closely on the corresponding thrust receiving surface 12 of the sealing insert, and thus force it firmly against the surface 13 of component 22.

The attachment of the fluid connector to the component 22 can be achieved as follows. The pipe end is thrust into the socket 3, to which it is attached by welding or brazing. Socket 3 can be threaded, but this does not always provide a leakproof joint at high fluid pressures, even when sealing members are provided between the threaded surfaces. The sealing surface 5 of the sealing insert is brought against the surface 13 of component 22 by adjusting the position of the plate 15 on the surface of the tailpiece 1, to correspond overall to the length of the gap between the pipe and the component 22. The component 22 can, for example, be the bulkhead of a ship, or the end face of another fluid line. In so doing, the plate 15 is rotated on the tailpiece until the thrust-delivering portion 21 is firmly and tightly brought to bear against the thrust-receiving portion 12 of the sealing insert 4. Then the bolts 19 are threaded into the sockets 20, to tighten the seal between the outer face 5 of the sealing insert and the end face 13 of the component 22. A leakproof seal there is assured by the O-rings. It will be noted that the thrust-loading surface 21 of plate 15 is so positioned that insert 4 extends beyond the end of the plate 15, so assuring a tight seal between the insert surface 5 and the component surface 13. The O-ring and anti-extrusion ring assembly 10, 11 assures a tight seal between the insert and the tailpiece.

It will be apparent from a consideration of the drawing and the above description that as the bolts 19 are tightened, the insert is sealed against both the component and the tailpiece. It is compressed against the face 13, positively confining the sealing O-ring 7, and it is reduced in diameter and caused to bind against tailpiece 1, thus preventing rotation or any other movement of the tailpiece in the final assembly. The reduction of diameter of the insert is within its elastic range; hence, the tailpiece is freed for adjustment or removal merely by loosening the assembly bolts 19.

As the assembly is pressurized by the fluid in the open passages 25, 26, 27 of the component 22, fluid connector and pipe, the load is absorbed by the bolts 19, and they tend to elongate. Consequently, the free length of the bolts should be kept to a minimum, to limit stretch to from 0.001 to 0.002 inch. In order to ensure that, as the bolts stretch, the face seal is not broken, the tailpiece and the insert are designed to expand approximately 0.003 to 0.005 inch. The radial displacement is transmitted along the angle of the thrust loading and receiving surfaces between the sealing insert and the holddown plate into an axial movement, thus ensuring that at all times there is a zero gap at the face seal O-ring.

Figure 2:
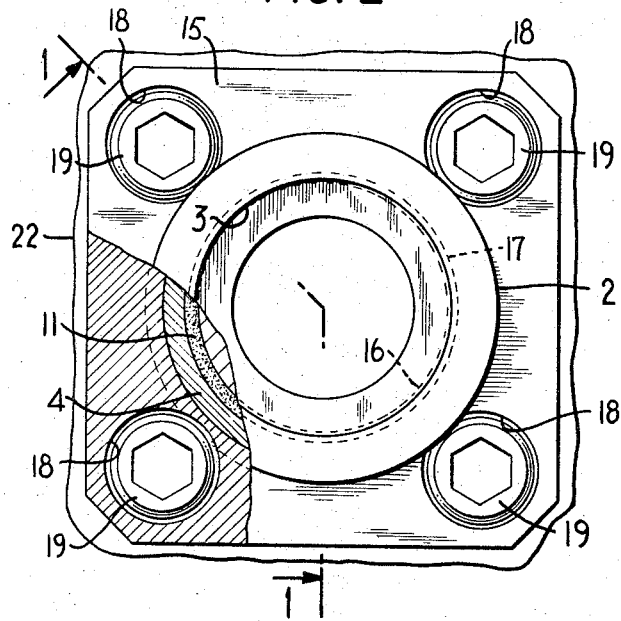
FIGURE 2 is an end view, partly cut away for better showing of the various parts, of the connector shown in FIGURE 1.
Figure 3:
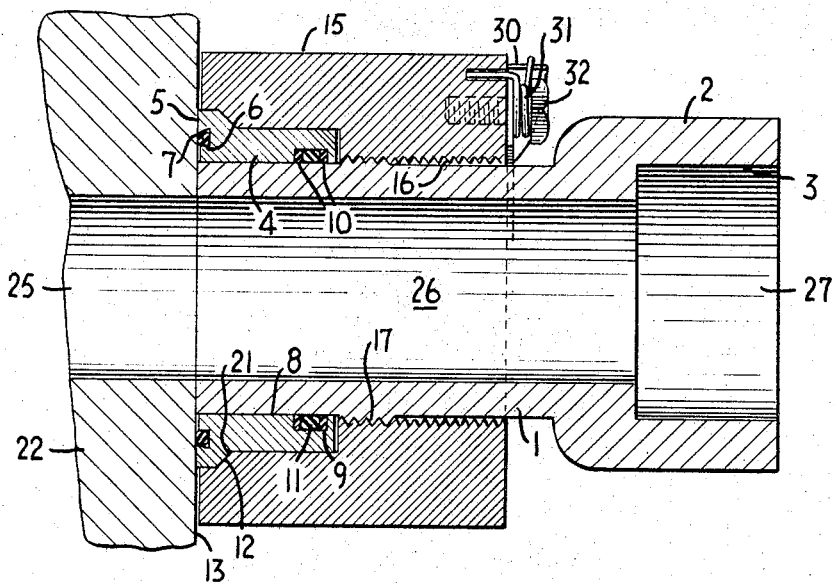
FIGURE 3 is a cross-sectional view of another embodiment of fluid connector, similar to that shown in FIGURE 1, but with a spring-loaded tab to prevent removal of the tailpiece from the holddown member during adjustment.
Figure 4:
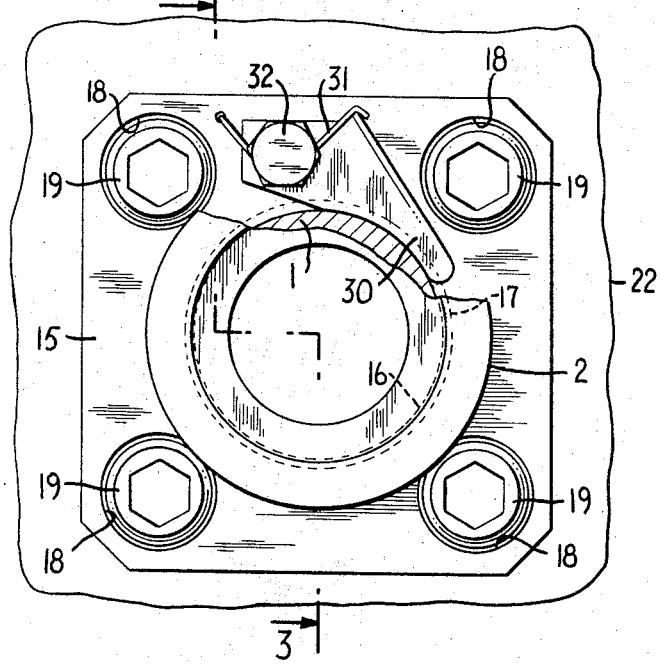
FIGURE 4 is an end view, with parts cut away, of the fluid connector of FIGURE 3.

It will be seen that the fluid connector of FIGURES 3 and 4 is identical to that of FIGURES 1 and 2, with the exception that there is provided in this embodiment an overrideable spring-loaded tab that rides on the unthreaded surface of the tailpiece to prevent backing off of the tailpiece from the holddown member during installation, so far that the seal between the tailpiece and the sealing insert is broken, and to prevent rotation of the holddown plate off the component connecting end of the tailplate. This tab 30, best seen in FIGURE 3 and 4, is biased upwardly by the spring 31, fitted in the tailpiece and held in position by the bolt 32. This tab gives a positive stop to the tailpiece when it meets the threaded portion of the tailpiece.

The fluid connector of FIGURE 5 employs a thrust-loading and thrust-receiving surface configuration slightly different from that of the connector of FIGURES 1 and 2. Whereas the previously described connectors have a plane surface, at a 45° angle to the plane of loading, the thrust-receiving surface 40 of the insert, and the thrust-loading surface 41 of the holddown plate 42 are shaped to a radius R from the central point 43, at an imaginary center in the component 22. In all other respects, the fluid connector is the same as that of FIGURES 1 and 2.

In the fluid connector of FIGURE 6, the tailpiece is in effect combined with the pipe that is to be connected to the component 22 by fashioning the end of the pipe 50 to provide an end portion 51 on which is slidably mounted the sealing insert 4 and threaded portion 52 on which is mounted the holddown plate 15.

In attaching this type of fluid connector to the component 22, the holddown plate 53 is rotated towards the component 22 along the threaded portion 52 of the pipe 50 until the end face 5 of the sealing insert 4 is brought firmly against the outer end face 13 of the component 22. The bolts 19 are then fitted into their sockets 20, as before, effecting a tight face seal between the insert 4 and the component end surface 13, completed by the O-ring 7. The length of the portion 51 is sufficient so as to accommodate any gap that may be encountered between the pipe 50 and the component 22.

The fluid connector of FIGURE 7 is designed to avoid the necessity of bolts 19. In this case, a threaded socket 60 is provided in the end surface of component 61 to which the connection is to be made. The outer surface of the holddown plate 62 is correspondingly threaded, so as to be fitted into threaded socket 60, and thereby thrust the sealing insert 4 in sealing relationship against the bottom face 63 of the socket 60.

This type of fluid connector is simply attached to the component 61 by threading the holddown plate 62 in the socket 60 until a firm seal is effected between the sealing insert 4 and the face 63 of the socket. Here again, the elongation of the socket and holddown plate is less than that of the sealing insert and tailpiece.

The structure shown in FIGURE 8 illustrates the use of a matching pair of fluid connectors, to attach two pipe lines through a bulkhead. The fluid connector 70 is a duplicate of that shown in FIGURES 1 and 2. The fluid connector 71 is similar, except that the passages 72 are threaded for reception of the bolts 73. The bulkhead 74 is provided with holes of a size to receive the bolts 73 therethrough. Thus, a plurality of bolts 73 can be used to attach both fluid connectors 70 and 71 firmly together and in a leakproof relationship to both faces of the bulkhead 74.

The structure shown in FIGURE 9 illustrates the use of a fluid connector of the type in FIGURE 6, wherein the tailpiece is in effect a fluid line as well, and is used to provide a connection between two closely fitted bulkheads. In this embodiment, the combined tailpiece and pipe connection 80 is threaded at each end, and is adapted to receive the sealing inserts 81, 82 over each end, with holddown plates 83, 84 threadably fitted thereover in the manner of the plates of FIGURES 1 and 2. The position of the plates 83, 84 on the tailpiece is adjusted to correspond to the gap between the bulkheads 85, 86, with the insert end faces 87, 88 brought firmly and snugly against the end faces of the bulkheads 85, 86. The bolts 19 can be tightened in the sockets 20 of the bulkheads, completing the assembly.

The fluid connector of FIGURE 10 has a tailpiece whose pipe connecting end 90 is adapted for butt welding to a fluid line or pipe. In other respects, the connector is identical to that of FIGURES 1 and 2.

It will be seen from the above description that the fluid connectors of the invention are simply constructed, with a minimum of removable parts, and can be of very small size. Because of the reduced size, and machining time, the fluid connectors are relatively inexpensive to fabricate as compared to previous connectors. They accordingly have an increased installation flexibility, due to the smaller overall size. Use of bolts, as compared to large unions, makes it possible to fit the connector in a space which would not accommodate one of the previous type designs. Furthermore, the fluid connectors of the invention cannot be backed off in a manner such that the O-ring seal between the end faces of the sealing insert and the component can be broken in use, because of use of a locking means, as for instance the spring-loaded tab fitted to the tailpiece member.

The simplicity of construction is such that as many as ten sizes of fittings can be handled with only four sizes of tailpieces and four sizes of flanges thereof.

It will be further noted that the fluid connectors in the invention provide axial adjustment and removal without disturbing the piping in an assembly. No additional unions are required to effect a leakproof seal.

Having regard to the foregoing disclosure, the following is claimed:

1. A connector for coupling a fluid line carrying high fluid pressure and a component to be attached to the fluid line comprising, in combination, a holddown member having a passage therethrough, of which a portion is threaded and an end portion is enlarged which includes a thrust-delivering surface; a tail piece adapted to be connected to the fluid line, and having a sealing surface and a threaded surface thereon, said surfaces disposed within said passage, said threaded surface threadably engaging the threaded portion of said passage; a relatively hard circumferentially continuous sealing insert having a bore therethrough, said bore having a diameter closely approaching the diameter of the sealing surface on the tailpiece, said sealing insert being slidably mounted on the tail piece sealing surface and fitting within and extending beyond the enlarged portion of the passage, dimensioned to always maintain a spaced relationship between the holddown member and the component, and having an end sealing surface adapted to seal against a surface of the component and a sealing surface in said bore adapted to seal against the sealing surface of the tail piece; and having a thrust-receiving surface adapted to engage the thrust-delivering surface of the holddown member at an angle of from about 30° to about 60° to the longitudinal axis of the tail piece, said holddown member being adapted to thrust the sealing insert axially toward the component and radially toward the tail piece, and compressing the insert both radially and axially, when the holddown member is forced against the insert, but permitting axial sliding movement of the insert on the tail piece under line pressure; and means for tightly holding the holddown member against the sealing insert to radially and axially compress the sealing insert and hold the sealing insert in a leak-proof seal against the sealing surface on the tail piece and against the component, whereby when the holddown member is tightened against the sealing insert by said means, the thrust-delivering and thrust-receiving surfaces engage to compress the insert radially and axially such that if the holddown member subsequently loosens, the sealing insert expands, thereby maintaining sealing contact between the sealing surfaces.

2. A fluid connector in accordance with claim 1, wherein the thrust-receiving and thrust-delivering surfaces are concentrically curved.

3. A fluid connector in accordance with claim 1, wherein the sealing surfaces of the sealing insert are provided with resilient sealing members.

4. A fluid connector in accordance with claim 1, wherein the tail piece, sealing insert, and holddown member are concentrically tubular.

5. A fluid connector in accordance with claim 1, having an overridable stop member to prevent removal of the holddown member from the tail piece over the end thereof facing the component.

References Cited
UNITED STATES PATENTS

| | | | |
|---|---|---|---|
| 275,269 | 4/1883 | Reid | 285—348 X |
| 896,204 | 8/1908 | Glauber | 285—348 X |
| 1,203,630 | 11/1916 | Koenig | 285—317 |
| 1,477,696 | 12/1923 | Dollman | 285—368 X |
| 2,058,735 | 10/1936 | Stallard | 285—175 X |
| 2,289,271 | 7/1942 | Kane et al. | 285—172 X |
| 2,422,597 | 6/1947 | Stewart | 285—116 |
| 2,507,261 | 5/1950 | Mercier | 285—368 X |
| 2,599,389 | 6/1952 | Hume | 285—351 X |
| 2,819,099 | 1/1958 | Rittle | 285—159 |
| 2,912,262 | 11/1959 | Frank | 285—354 X |
| 3,216,748 | 11/1965 | Gunberg | 285—55 X |

FOREIGN PATENTS 100,575  12/1940  Sweden.

CARL W. TOMLIN, *Primary Examiner.*

D. W. AROLA, *Assistant Examiner.*